United States Patent Office

3,534,003
Patented Oct. 13, 1970

3,534,003
POLYAMIDE IMIDES PREPARED FROM AROMATIC CYCLIC SULFONE AMINES AND HALOFORMYLPHTHALIC ANHYDRIDES
Fred F. Holub, Scotia, and John T. Hoback, Schenectady, N.Y., assignors to General Electric Company, a corporation of New York
No Drawing. Filed May 8, 1968, Ser. No. 727,650
Int. Cl. C08g 20/32
U.S. Cl. 260—78
6 Claims

ABSTRACT OF THE DISCLOSURE

Polymeric amide acid resins are prepared by the reaction of an aromatic cyclic sulfone amine and a haloformylphthalic anhydride. The amide acid resin thus obtained can be heated at elevated temperatures to form a polymeric amide imide product. The compositions herein described, are useful as insulation for electrical conductors and as high temperature protective films.

This invention relates to novel polymeric compositions made from the reaction of an aromatic diamino cyclic sulfone hereinafter referred to as "cyclic sulfone," and a haloformylphthalic anhydride, and ultimate conversion by heat of the polyamide acid reaction product to the polyamide imide structure. More particularly, this invention is concerned with a composition of matter composed of recurring structural units of the formula:

I 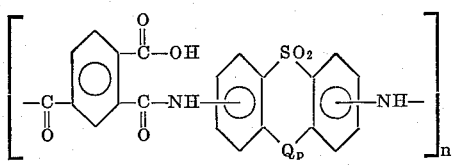

where Q is a member selected from the class consisting of —CH$_2$—, —C(CH$_3$)$_2$—, —C(C$_6$H$_5$)$_2$—, —O—, —S—, —SO$_2$—,

—Si(CH$_3$)$_2$—, and —NR—, where R is hydrogen or methyl, $p$ is a whole number from 1 to 0, inclusive and $n$ is a whole number greater than 1, e.g., 10 to 10,000 or more. The invention also encompasses polyamide imides derived from such polyamide acids, wherein the recurring structural units are of the formula:

II 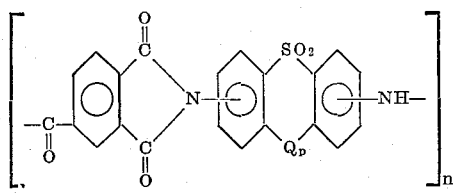

where Q, $p$, and $n$ have the meanings given above. In Formulas I and II, each of the nitrogens is meta or para to Q.

Polyamide resins are disclosed in U.S. 3,260,691 issued July 12, 1966, as being obtained by reacting a haloformylphthalic anhydride and an aromatic diamino compound. Although, such polyamides when converted to the polyamide imide structure have been found to have good properties, it would be desirable to improve certain characteristics of polymers of this class, particularly their resistance to elevated temperatures, especially when employed as insulation for electrical conductors. One of the important requirements for insulated conductors, particularly, fine wire insulated conductors as used in motors, is that they be able to withstand winding operations so that the superposition of one layer of wire on the other during the winding operation will not effect any cut-through, so as to cause short circuits in the wound motor. Although the use of linear aromatic diamino compounds when making such compositions imparts good properties in this respect, we have unexpectedly found that by employing a cyclic sulfone of the general formula:

III 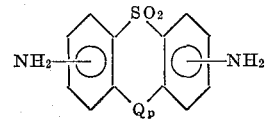

where Q and $p$ have the meanings above and the —NH$_2$ group is meta or para to the Q group, in place of the usual aromatic linear diamino compounds such as, benzidine, 4,4'-diaminodiphenyl oxide, etc., marked improvement in the heat resistance and cut-through temperature of the insulated conductors can be achieved.

The main object of the present invention, therefore, is to provide soluble or shapeable compositions of polyamide acids, which can be converted to polyamide imide structures having even more desirable properties than those derived from polyamide acids made from a non-cyclic sulfone diamino compound. Other objects will appear hereinafter, as the invention is described in greater detail.

The process of preparing the polyamide acid compositions of Formula I comprises reacting at least one organic diamino cyclic sulfone of Formula III with at least one 4-haloformylphthalic anhydride, for instance, 4-chloroformylphthalic anhydride, having the formula:

IV 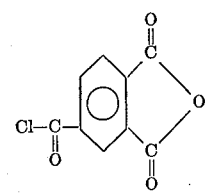

advantageously in an inert organic liquid which is a solvent for at least one reactant, said solvent being inert to the reactants, and preferably under anhydrous conditions, for a time of the order of at least one minute and at temperatures below 125° C., sufficient to provide a solution containing at least 50% of the corresponding polyamide acid. In determining the specific time and temperature for forming the polyamide acid, several factors should be considered. The maximum permissible temperature will depend on the particular aromatic cyclic sulfone diamine or any other diamine used in combination therewith, the formyl anhydride used, the particular solvent, the percent solids of polyamide acid resin which is desired in the final solution, and the minimum period of time one desires for reaction. Generally, temperatures below 75° C. are adequate for the purpose. As the temperature increases, there is a tendency for the polyamide acid to imidize thereby increasing the chances for greater insolubility of the final product in the solvent. An advantageous temperature of reaction to form a product of maximum degree of polymerization and yet have a satisfactory degree of solubility requires that temperatures throughout the reaction should be maintained below 50° C. and advantageously between —10 to 30° C.

After forming the polyamide-acid solution, the unreacted materials can be removed and the solution used as such for coating purposes, for film formation, etc. Alternatively, the polyamide-acid may also be treated to remove solvent and used as a shapeable (i.e., moldable) material.

In general, the process for making the polyamide-acid may involve premixing equimolar amounts of the aromatic cyclic sulfone diamine and the formylphthalic anhydride and adding the mixture in small portions with agitation to the organic solvent. Dissolving each of the reactants in a solvent and thereafter mixing the two solutions may also be employed. Since the reaction tends to be exothermic and to accelerate quite rapidly, it is important in many instances to regulate the additions and the temperature to maintain the reaction temperature below a predetermined volume, such value being based on the desirability of obtaining a certain percentage of the polyamide-acid in the final reaction product. In all instances, agitation of the reactants is advantageously employed while at the same time maintaining anhydrous conditions. The molar concentration is usually equimolar for obtaining a high molecular weight product. However, the use of either reactant in an excess of up to 5 mole percent is not precluded. Greater molar excesses can cause reduction of the molecular weight.

The polyamide-acid thus formed can be characterized by its degree of molecular weight and solubility by means of its intrinsic viscosity when measured at 30° C., at a concentration of 0.5 percent, by weight, of the polymer in a suitable solvent such as N-methyl-2-pyrrolidone. The intrinsic viscosity of the polyamide-acid should be at least 0.1 and preferably in the neighborhood of about 0.2 to 4 or 5.

The quantity of organic solvent used in the present invention need be only that sufficient to dissolve enough of the reactants to form a medium for initiation of the reaction between the aromatic cyclic sulfone diamine and the formylphthalic anhydride. Generally, the solvent comprises from 10 to 90% of the total weight of all the ingredients.

Although the invention is intended to focus on the use of the aromatic cyclic sulfone diamine, it will be apparent to those skilled in the art that other aromatic (or even aliphatic) diamines may be used in conjunction with the cyclic sulfone diamine without departing from the scope of the invention. Thus, the cyclic sulfone diamine may be substituted with up to 40 to 80%, by weight, thereof with another organic diamine of the formula:

V                      $H_2N—R'—NH_2$ where R' is a divalent organic radical and may be any one of the following groups: aromatic, aliphatic, cycloaliphatic, a combination of aromatic and aliphatic, heterocyclic, bridged organic radicals wherein the bridge is oxygen, nitrogen, sulfur, silicon or phosphorus, or substituted groups thereof. Most generally, the diamines used with the cyclic sulfone diamines are primary diamines. Among the diamines which are suited for use in the present invention in combination with the cyclic sulfone diamine are meta-phenylene diamine; para-phenylene diamine; 4,4'-diamino-diphenyl propane; 4,4-diaminodiphenyl sulfone; 3,3' - diamino - diphenyl sulfone; 4,4' - diamino-diphenyl ether; 2,6-diamino pyridine; bis-(4-amino-phenyl) diethyl silane; bis-(4-amino-phenyl) phosphine oxide; bis-(4-amino-phenyl)-N - methylamine; 1,5 - diamino - naphthalene; 3,3'-dimethyl-4,4' - diamino - biphenyl; 3,3' - dimethoxy benzidine; 2,4 - bis-(beta-amino-t-butyl-phenyl) ether; para-bis-(2-methyl-4-amino-pentyl) benzene; para-bis-(1,1-dimethyl-5-amino-pentyl) benzene; m-xylylene diamine; p - xylylene diamine; bis-(para-amino-cyclohexyl) methane; hexamethylene diamine; heptamethylene diamine octamethylene diamine; nonamethylene diamine; decamethylene diamine; 3-methylheptamethylene diamine; 4,4-dimethylheptamethylene diamine; 2,11-diamino - dodecane; 1,2 - bis(3 - amino propoxy) ethane; 2,2 - dimethyl propylene diamine; 3 - methoxy-hexamethylene diamine; 2,5 - dimethylhexamethylene diamine; 2,5 - dimethylheptamethylene diamine; 5 - methyl-nonamethylene diamine; 1,4 - diamino-cyclohexane; 1,12 - diamino-octadecane: $H_2N(CH_2)_3O—(CH_2)_2O(CH_2)_3NH_2$; $H_2N(CH_2)_3S(CH_2)_3NH_2$;

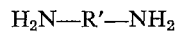$H_2N(CH_2)_3N(CH_3)(CH_2)_3NH_2$;

and mixtures thereof.

Any solvent may be employed in making the polyamide acids. The solvent should be inert to the system and should be a solvent for the reaction product, and certainly must be a solvent for at least one of the reactants and preferably for both of the reactants: Additionally, the solvent should be one which can be readily removed by volatilization and by application of reasonable amounts of heat. Among such solvents which may be mentioned are N,N-dimethylsulfoxide, N - methyl - 2-pyrrolidone, tetramethmethoxy acetamide, N-methyl caprolactam, etc. Other solvents which may be used in the present invention are: dimethylsulfoxide, N - methyl - 2-pyroolidone, tetramethylene urea, pyridine, dimethylsulfone, hexamethylphosphoramide, tetramethylene sulfone, formamide, N-methyl-formamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

The aromatic sulfones of Formula III can be prepared by several methods. One method for preparing such compositions of matter where Q is $—CH_2—$ and $p$ is 1, is found in Berichte, vol. 27, page 2806 (1894). Additional directions for making such cyclic sulfones are found described in our copending application (RDCD–1524), Ser. No. 727,667, filed concurrently herewith and assigned to the same assignee as the present invention. By reference, the disclosures in this copending application are made part of the disclosures of the instant application. Other cyclic sulfones embraced by Formula III and methods of preparing the same are found recited in the literature.

In order that those skilled in the art can better understand how our invention can be practiced, the following examples are given by way of illustration and not by way of limitation. All parts are by weight unless otherwise indicated.

In the following examples, it is desirable to determine whether the insulation on a magnet wire will flow when the wire is raised to an elevated temperature under compressive stress. To establish this, the cut-through temperature is determined. This cut-through temperature is the temperature at which the enamel wire separating two magnet wires cross at 90° and supporting a given load on the upper wire flows sufficiently to establish electrical contact between two conductors. Since magnet wires in electrical apparatus may be under compression, it is important that the wires be resistant to softening by high temperature so as to prevent short circuits within the apparatus. The tests are conducted by placing two eight inch lengths of enameled wire perpendicular to each other under a load of 1000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate. The temperature at which this circuit is established is measured by a thermocouple extending into a thermowell to a point directly under the crossed wires. The cut-through temperature is taken as the temperature in the thermowell at the moment when the current first flows through the crossed wires.

EXAMPLE 1

A reaction vessel was charged with 18.9 grams N, N-dimethylacetamide, 1.6 grams (0.02 mole) pyridine, and 2.63 grams (0.01 mole) 4,4' - methylene - 3,3' - sulfonyl dianiline. The mixture was stirred until homogenous using an ice bath to cool the solution to 4° C. While stirring vigorously, 2.1 grams (0.01 mole) 4-chloroformyl-phthalic anhydride was added slowly and the mixture was additionally stirred until it reached room temperature (about 25–30° C.). The solution was then poured into 100 ml. of methanol containing 3 grams of formic acid and stirred vigorously. The precipitated solid obtained was filtered and dried. About 2 grams of the above prepared polycyclic sulfone amide acid resin, which was composed of recurring structural units of the formula:

VI 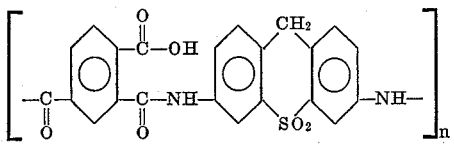

where $n$ is a whole number in excess of 1, was dissolved in 8 grams of N - methyl - 2 - pyrrolidone to give a solution which was about 20% solids. Films were cast from this solution on a glass surface and heated under nitrogen at 100° C., for one hour, 150° C., for one hour, 200° C., for one hour, and at 250° C., for one hour. The films thus obtained were extremely flexible and were found to have a cut-through temperature in excess of 410° C., and an intrinsic viscosity $|\eta|$ 0.57. This polyamide imide composition was composed of recurring structural units of the formula:

VII 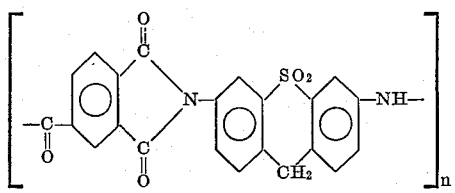

where $n$ has the value given above.

EXAMPLE 2

Employing the same conditions and procedures as in Example 1, a polyamide acid resin was prepared by effecting reaction between a mixture of ingredients in N,N'-dimethyl acetamide solvent of 0.1 mole 4-chloroformylphthalic anhydride, 0.05 mole 4,4'-methylene dianiline, and 0.05 mole 4,4' - methylene - 3,3' - sulfonyl dianiline. The resinous solution thus obtained contained a polyamide acid composed of the recurring structural units of Formula VI and structural units of the formula:

VIII 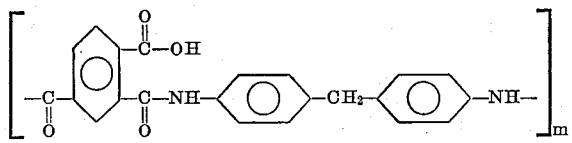

where small $m$ is a whole number in excess of 1, e.g., 10 to 5000 or more. A portion of this polyamide acid solution was cast on a glass substrate and heated at elevated temperature under nitrogen using the same heating condition as in Example 1, to yield a polyamide imide resin composed of recurring structural units of Formula VII and of:

IX 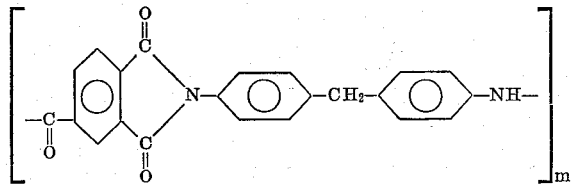

where $m$ has the meaning given above. For comparison, a polyamide acid resin was prepared similarly as above, with the exception that equimolar amounts of 4-formylphthalic anhydride and 4,4'-methylene dianiline were employed omitting the 4,4' - methylene - 3,3' - sulfonyl dianiline. The polyamide acid solution thus obtained was cast on a glass substrate and heated in the same manner as above to obtain a polyamide imide resin composed of recurring structural units of Formula IX. Each of the two polyamide imide polymers was tested for cut-through; it was found that the polyamide imide containing the cyclic sulfone had a cut-through temperature of 375° C., while the other polyamide imide without the cyclic sulfone had a cut-through of 330° C.

EXAMPLE 3

A reaction vessel flushed with nitrogen was charged with 19.37 grams N,N-dimethylacetamide, 1.6 grams pyridine and 2.46 grams (0.01 mole) benzidine sulfone diamine [prepared in accordance with directions in an article by C. Courtet and R. Evain, Bull. Soc. Chim. (4), 49, 527 (1931)] having the formula:

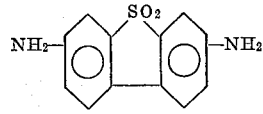

The mixture was stirred until homogeneous and then cooled to 4° C. before adding 2.1 grams (0.01 mole) 4-chloroformylphthalic anhydride slowly with vigorous stirring. The mixture exothermed but was kept at 10° C. or below for one hour and then allowed to warm to room temperature. The solution was then poured into 100 ml. methanol containing 3 grams of formic acid and the precipitate which resulted was separated. The latter was dried at 50° C. under vacuum for five hours to give a polymer which was composed of recurring structural units of the formula:

X 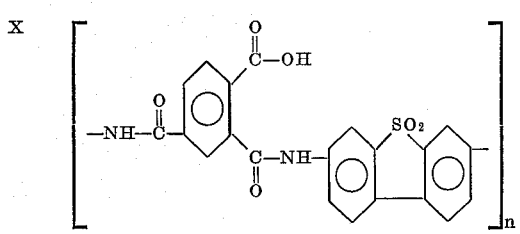

where $n$ is a whole number in excess of 1. A solution of this polymer was made by dissolving 2 grams of the latter in 8 grams of N-methyl-2-pyrrolidone. Films were cast on a glass surface and cured under nitrogen for the same cycle as in Example 1 to give a flexible film which had a cut-through temperature of greater than 400° C. This polyamide imide was composed of recurring structural units of the formula:

XI 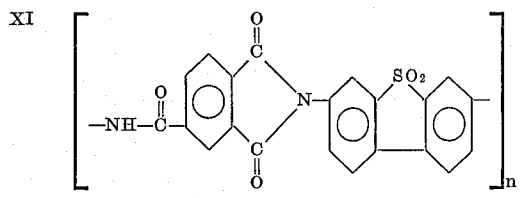

where $n$ has the value above.

EXAMPLE 4

Employing the conditions recited in Example 1, a polyamide acid is first prepared from 4-chloroformylphthalic anhydride and 2,8-diaminothiaxanthone dioxide [the preparation of which is described in an article by E. D. Amstutz and C. R. Neumoyer, J. Amer. Chem. Soc. 69, 1925 (1947)] and the polyamide acid thereafter is heated under the same conditions as recited in Example 1 to give a polyamideimide of the corresponding cyclic sulfone having good cut-through temperatures.

EXAMPLE 5

Employing the conditions recited in Example 1, a polyamide acid is prepared from 4-chloroformylphthalic anhydride and 2,8-diamino-phenothiazine-5-dioxide [the preparation which is described in an article by J. G. Michels and E. D. Amstutz, J. Am. Chem. Soc. 72, 888 (1950)] and the polyamid acid is then heated under the conditions recited in Example 1 to give a flexible film of the corresponding polyamideimide.

EXAMPLE 6

Employing the conditions recited in Example 1, the polyamide acid is prepared from the reaction of 4-chloroformylphthalic anhydride and 2,8-diaminophenoxathiin-5-dioxide [the preparation of which is described in an article by E. D. Amstutz, J. Am. Chem. Soc. 72, 3420 (1950)] and the formed polyamide acid is converted to the corresponding polyamideimide by heating in the manner described in Example 1.

EXAMPLE 7

Empolying the conditions recited in Example 1, 4-chloroformylphthalic anhydride is reacted with 2,8-thiantherene-diamine - 5,5,10,10-tetraoxide [the preparation which is described in a Japanese article by T. Kawai and T. Ueda, Yakugaku Zasshi 80, 1648 (1960)] and the corresponding polyamide acid is heated under the conditions recited in Example 1 to give the corresponding polyamideimide having good cut-through temperatures.

EXAMPLE 8

Empolying the conditions recited in Example 1, a polyamide acid is prepared from the reaction of 4-chloroformylphthalic anhydride and a diamino cyclic sulfone having the formula:

XII 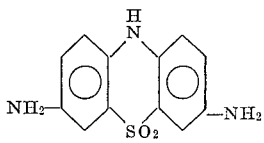

[which can be prepared in accordance with an article by L. Daleva, Farmatsiya (Sofia) 1961, No. 4, 7–16] and the formed polyamide acid is converted to the corresponding polyamideimide by heating under the conditions recited in Example 1.

The polyamide acid compositions herein described, whether in solution form or in the solvent-free form are shapeable either after depositing from the solvent or by molding techniques and can be made into films, filaments, tubings, etc. Thereafter by heating these polyamide acid compositons at temperatures ranging from about 150 to 300° C. for times in the order from 15 minutes to several hours or more, one forms the polyamide imide structure which is substantially infusible and insoluble. Obviously, the polyimide structures have properties which are even more desirable than the polyamide acids because of their infusibility and insolubility. However, the fact that the polyamide-acid resins are in an intermediate state of polymerization and therefore are soluble and shapeable, makes these compositions useful for a number of applications.

Thus, the polyamide-acid solutions can be applied to substrates, for example, metals (such as, copper, brass, aluminum, steel, etc.), the metals in the form of sheets, fibers, wires, screening, etc.; glass in the form of sheets, fibers, foams, fabrics, etc.; polymeric materials, for example, cellulosic materials such as wood, paper, etc.; polyolefins, such as polyethylene, polypropylene, polystyrene; polyesters, such as polyethylene terephthalate, etc.; perfluorocarbon polymers, such as polytetrafluoroethylene, copolymers of tetrafluoroethylene with hexafluoropropylene, etc.; polyurethanes, all polymeric materials in the form of sheets, fibers, foams, woven and nonwoven fabrics, screening, etc.; leather, sheets, etc. Thereafter the polyamide-acid resin can be converted by the usual heat treatment to the polyamideimide structure with its improved physical and thermal properties.

Polyamideimide films and sheets made in accordance with our invention are especially useful in high temperature applications where resistance to solvents and high temperatures are a requirement. Thus, such films can be employed as a means for packaging and protective applications. Additionally, polymers and film-forming polymers herein described may be used in high temperature electrical applications, as insulation in motors, for slot liners in transformer and capacitor applications, cable wrappings, etc. Finally, the structures made of the polyamide-acid polymers themselves or solutions of the latter may be employed to treat various fibrous sheets which could then be heated to remove solvent (if present) and thereafter superimpose the sheets one on the other and heat them at elevated temperatures under pressure to convert the polyamide-acid resin to the polyamideimide state and form a tough, infusible and insoluble laminate highly resistant to heat. Fibers prepared from the polyamide-acid resin and ultimately converted to the polyamideimide state offer use for high temperature electrical insulation, protective clothing, filtration media, packing materials, brake linings, etc.

It will, of course, be apparent to those skilled in the art that in addition to the 4 chloroformyl phthalic anhydride employed in the foregoing examples, 4-haloformylphthalic anhydrides such as the 4-bromo- or 4-fluoro derivatives may be used without departing from the scope of the invention. In addition, other aromatic cyclic sulfones, corresponding to Formula III can be used in place of the cyclic sulfones in the preceding examples with equal facility. Mixtures of the 4-haloformylphthalic anhydride with other organic dianhydrides, as well as combinations of other organic diamines free of the cyclic sulfone grouping with the aromatic cyclic sulfone can be employed to give new and useful products.

What we claim as new and desire to secure by Letters Patent of the United States is:

1. Resinous compositions selected from the class composed of recuring structural units of the formula (a)

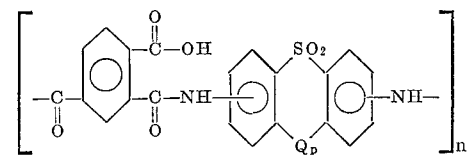

and (b) those having recurring structural units of the formula:

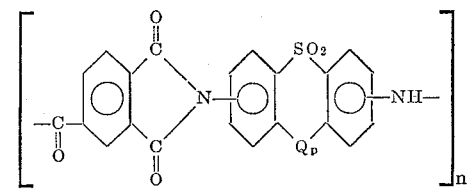

where Q is a member selected from the class consisting of —$CH_2$—, —$C(CH_3)_2$—, —$C(C_6H_5)_2$—, —O—, —S—, —$SO_2$—,

—$Si(CH_3)_2$, and —NR—, where R is hydrogen or methyl, $p$ is a whole number equal to from 0 to 1, inclusive, $n$ is a number in excess of 1, and the nitrogen atoms are meta or para to Q.

2. A resinous composition of matter composed of recurring structural units of the formula:

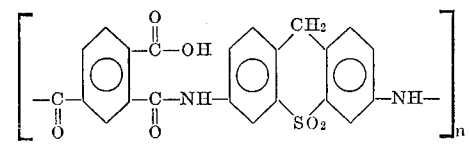

where $n$ is a number in excess of 1.

3. A resinous composition of matter composed of recurring structural units of the formulae:

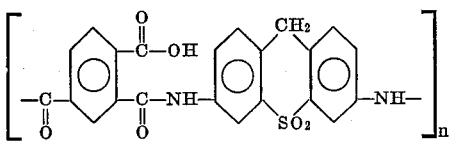

and

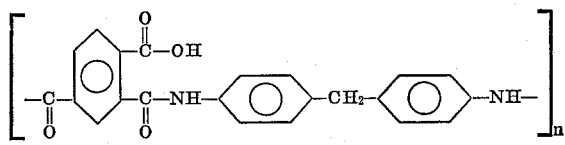

where $n$ is a number in excess of 1.

4. A resinous composition of matter composed of recurring structural units:

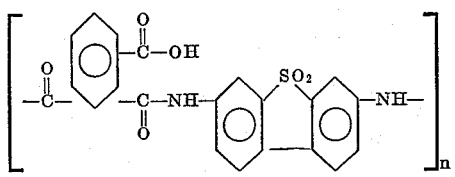

where $n$ is a number in excess of 1.

5. A resinous composition of matter composed of recurring structural units of the formula:

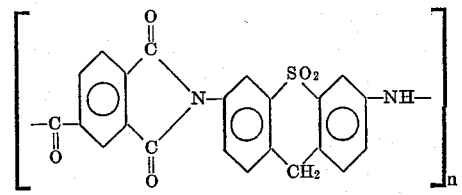

where $n$ is a whole number in excess of 1.

6. A resinous composition of matter composed of recurring structural units of the formulae:

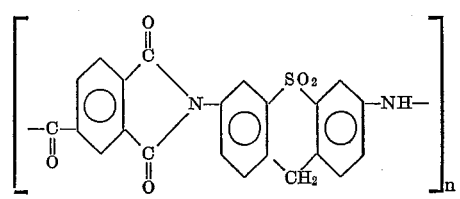

and

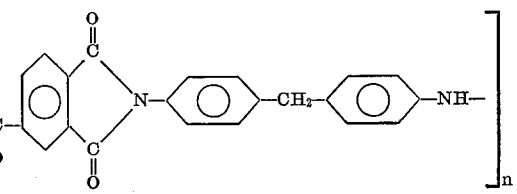

where $n$ is a number in excess of 1.

References Cited
UNITED STATES PATENTS

| | | | |
|---|---|---|---|
| 3,179,614 | 4/1965 | Edwards | 260—30.2 |
| 3,179,634 | 4/1965 | Edwards | 260—78 |
| 3,322,728 | 5/1967 | Hill et al. | 260—78 |
| 3,260,691 | 7/1966 | Lavin et al. | 260—30.2 |
| 3,410,868 | 11/1968 | Harris | 260—327 |

WILLIAM H. SHORT, Primary Examiner

H. SCHAIN, Assistant Examiner

U.S. Cl. X.R.

117—124, 128.4, 132, 148, 155, 161, 232; 161—214, 227, 228, 229, 230; 260—30.2, 30.6, 30.8, 32.4, 32.6, 47, 63